UNITED STATES PATENT OFFICE.

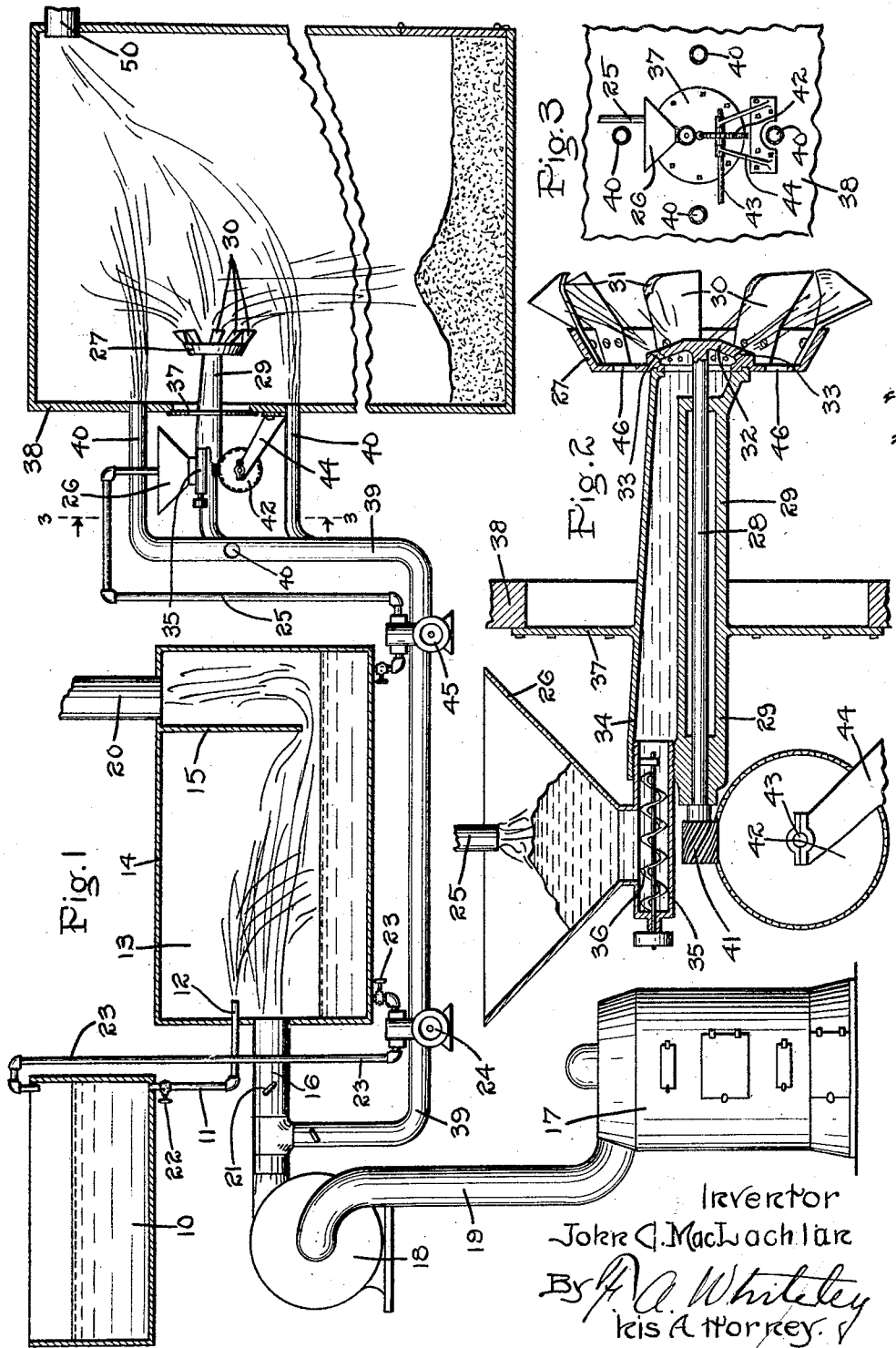

JOHN C. MacLACHLAN, OF ST. PAUL, MINNESOTA, ASSIGNOR TO STANDARD FOOD PRODUCTS COMPANY, OF ST. PAUL, MINNESOTA, A CORPORATION OF DELAWARE.

METHOD OF DESICCATING FLUID MIXTURES.

1,398,735.   Specification of Letters Patent.   Patented Nov. 29, 1921.

Application filed August 21, 1916, Serial No. 115,997. Renewed February 2, 1921. Serial No. 441,995.

*To all whom it may concern:*

Be it known that I, JOHN C. MACLACHLAN, a citizen of the United States, residing at St. Paul, in the county of Ramsey and State of Minnesota, have invented certain new and useful Improvements in Methods of Desiccating Fluid Mixtures, of which the following is a specification.

My invention relates to the method of desiccating certain fluid mixtures such as milk, buttermilk, blood, etc., so as to separate the water from the solid constituents thereof and retain said solid constituents in granular form. In the practice of my invention there are two important steps; first, to reduce the mixture to a pasty condition by a novel process which insures the retention of the original flavor of the mixture; and second, to disintegrate the pasty material in heated air currents, throwing said material in the form of particles into said air currents and subjecting them to the action of the air currents for a time sufficient to withdraw the remaining moisture from the disintegrated particles and permit the same to be collected as dried granules.

It is an especial object of my invention to produce such dry granular product having the particles of somewhat large size, as I have discovered that when dried in that condition milk or buttermilk in particular retain best the natural flavor and are much more readily reduced to the liquid form. This is due to the fact that more of the volatile substance of the milk is held within the pores of the granular particles after the same have been reduced to the dried form.

The first step of my process as above outlined is important in that while the milk is being thickened to the pasty consistency the volatile elements referred to other than water are retained in the reduced pasty material. This is accomplished by introducing the milk in the form of spray into a regulated current of heated air within a chamber closed excepting for the air admission and outlet openings, the amount of spray of milk relative to the current of air being such that the evaporting effect of the air current will be insufficient to take away all of the water of the milk or other mixture. After a given quantity of milk or other mixture has been so treated and the resulting thickened mixture has accumulated within the container therefor in the chamber I may still further thicken the mixture by withdrawing the first accumulation and diluting it with a quantity of milk or other untreated mixture, preferably about equal volume, and again passing it through the spray condenser. Ordinarily a second operation will produce a mixture of sufficiently pasty consistency, but it is obvious that the operation may be repeated as often as desired, each time resulting in a product having less water or of more pasty consistency. This method of mixing the partially thickened material with fresh material and gradually reducing the consistency to pasty form I have found greatly aids in the retention of the aforesaid volatile substances and in the consequent high quality of the product.

In carrying out the second step of my process I preferably employ a rotatable member provided with a number of peripheral projections against which the thickened or pasty material is thrown by centrifugal force, thus physically disintegrating and breaking up the pasty material into a multiplicity of particles. The action of this apparatus may be regulated so as to break up the pasty material into particles of varying sizes to be determined by the variable conditions under which the product is being made. These particles are thrown radially outwardly from the rotatable member into a current or currents of heated air, where the same are quickly dried in granular form, the size of granules being regulated by the extent of disintegration as above noted. As the granules are fully dried they fall by gravity to a suitable collecting space and are removed in any desired manner.

The full objects and advantages of my invention will appear in connection with the detailed description thereof and are particularly pointed out in the claims.

In the drawings, illustrating the application of my invention in one form,—

Figure 1 is a diagrammatic view of the apparatus used in my novel process. Fig. 2 is an enlarged sectional detail view of the centrifugal member employed in my process. Fig. 3 is an elevational sectional view on line 3—3 of Fig. 1.

In the preliminary drying of the milk as it comes in the fresh state from the farmer or dairyman I have illustrated a spraying desiccator, though any similar form of device may be used as desired. The fresh milk is placed in a vat or reservoir 10 where it is fed by gravity through a pipe 11 into the spraying nozzle 12 of a desiccator 13. This desiccator comprises a cabinet or casing 14 near one end of which is positioned a vertical portion 15 extending down from the top to within a short distance of the bottom thereof. Immediately below nozzle 12 is situated an air inlet 16 through which a current of heated air from a furnace 17 is forced by means of a blower 18 through a pipe line 19. The top of cabinet 14 between partition 15 and the adjacent wall of said cabinet is provided with an air outlet 20. It will now be perceived that the spray of milk from nozzle 12 is projected into the stream of heated air from inlet 16, and so dried, separating the air and liquid at the portion or baffle 15, the air escaping through vent 20 and the partly thickened milk being deposited at the bottom of the cabinet. By varying the volume of air through inlet 16 by means of a damper 21 or by varying the flow of milk through pipe 11 by means of a valve 22 any spissitude of the milk at the bottom of cabinet 14 can be procured.

At the bottom of cabinet 14 is a pipe 23 which leads up to and discharges into vat 10. A pump 24 is interposed in this pipe and is adapted to pump the thickened milk from cabinet 14 back into vat 10. The method of operation is as follows: The vat 10 is filled with the amount of milk to be desiccated and the same is then allowed to flow into the desiccator 13 until a certain proportion of the fresh milk remains in vat 10. The thickened portion is then pumped back into vat 10 and the mixture desiccated to the proper spissitude. This thickened mixture may now be entirely transferred to the portion of the apparatus for reducing it to the dry form and the above steps repeated, or a portion only of the thickened mixture from each batch may be pumped back again and mixed with a correct proportion of fresh milk. The second expedient causes the mixture to contain milk under all stages of condensation up to the final degree, while the former provides only the two degrees. The latter method has however been found to be the more satisfactory.

The thickened milk upon leaving the desiccator 13 is caused to pass through a pipe 25 by means of a pump 45 into a hopper 26 of a device best shown in Fig. 2, where the same is finally reduced to the dry form. This device comprises a cup-shaped member 27 formed integral with a shaft 28 journaled in a tubular casing 29. Member 27 has attached to it a number of peripheral vanes or blades 30 which have one corner turned inward at 31. The central portion of member 27 is made to bulge outward at 32, which portion is provided with a number of diagonally-positioned circumferentially-disposed holes 33. A feed pipe 34 extends along the upper portion of casing 29 and communicates with the portion 32 at the center of member 27. Pipe 34 has screwed into it a trough 35 in which is mounted a screw conveyer 36 and to which is attached the aforementioned hopper 26. When the thickened milk is discharged into hopper 26 through pipe 25 it is conveyed through the feed pipe 34 against the rapidly-rotating member 32, where the same is discharged by centrifugal force through the apertures 33 in portion 32 against the blades 30 and broken up into particles of the size desired.

Tube 29 and pipe 34 are provided with a flange 37 by means of which the whole device may be mounted in a cabinet 38 best seen in Fig. 1. An air line 39 connected with furnace 17 and blower 18 communicates with cabinet 38 through a number of inlets 40 positioned circumferentially about the center of member 27 and extending through the wall of said cabinet. As member 27 is rotated the milk is tangentially discharged from it in proper-sized particles and a current of air from inlets 40 is forced through the mass of sheet of viscous substance thrown from said member and out through a tube 50, thus drying the same to the solid form. Member 27 is remotely situated from the wall of cabinet 38 on which it is mounted and is provided with apertures 46 through which air may enter to relieve the vacuum which would otherwise be produced. It may here be mentioned that in order to have the particles of dimensions greater than that of powdered form to provide what may be termed granules, it is necessary to have the milk or substance treated of quite a viscous consistency or of a pasty semi-fluid nature prior to the final drying of the same. In such a state it is impossible to break up the same by any of the usual devices as the substance cannot be sprayed in the ordinary manner. The degree of heat necessary in this last stage is hence not so great and certain portions of the volatile substance of the milk is maintained within the pores of the granules, giving it a more natural flavor.

The drive for driving shaft 28 may comprise a pair of spiral gears 41 and 42 of which 42 is the driver and is supported on a shaft 43 journaled in a bracket 44 secured to cabinet 38. If convenient a high speed electric motor may be substituted for this arrangement, or any other form of drive desired.

Hitherto, liquids have been sprayed and dried in the form of powder, but so far as I am aware, I am the first to produce a granular product from pasty or semi-fluid substances. The commercial advantages of the granular substance over the pulverized substance are very marked. Certain of these advantages have already been stated and are very marked as has been noted. A good granular formation cannot be produced from a thin liquid and good granulation cannot be produced even from a semi-fluid or pasty substance, without a beating action. In accordance with my invention, therefore, the heavy pasty material is discharged in small particles and thrown violently outward, and as it flies outward under the action of centrifugal force, is intercepted and violently struck or beaten by the rapidly moving beater blades 30. These beating blades break up or crack the pasty substance while it is being rapidly dried in the hot air of the drying chamber and it is, therefore, also important that this beating action take place in the presence of a hot drying medium.

The granular products which I have made from sweet milk, buttermilk and malted milk, for example, are not only of granular form, but of a granular form of peculiar formation. Even as viewed by the naked eye, each granular mass is seen to be made up of a plurality of particles. When one of these granular masses is viewed through a magnifying glass of but low magnifying power, the particles making up the granular mass appear to have a crystalline character, and to be of a spongy nature. It will be found that these granular masses, by a roller or grinding pressure, may be very easily reduced to powdered form. When, however, they are put into water, even if the water is cold, such granular masses quickly absorb the water, and hence, quickly dissolve and do not form a pasty substance with the water. The difficulty hitherto encountered in dissolving powdered substances in cold water, for example, and even in warm or hot water, is well known. There is no such difficulty encountered in the use of my improved granular product, and moreover, as stated, the granular product better preserves the original flavor of the material from which the substance is formed.

The advantages of my invention are manifest. The process is found to be more economical since more of the original substance is brought down with the solid matter than is the case in similar processes.

An apparatus very suitable for carrying out this improved process is disclosed and claimed in my Patent No. 1,301,288, of April 22nd, 1919, entitled Apparatus for granulating semi-fluid materials.

This improved method, as well as the device or apparatus, is especially adapted for forming granular substances above stated, but from a broad point of view, the process is adapted for producing food products, or the like, in finely divided form. The important operations for accomplishing this result are, first, the projecting of the material outward under high velocity, and second, in intercepting and beating of the same.

It is also highly important that this intercepting and beating take place in the presence of a hot or warm drying medium, such as hot or warm dry air.

I claim:

1. The process of reducing heavy liquid or semi-liquid substances to dry finely divided form, which consists in projecting the same at high velocity within a space containing a hot gaseous drying material, and in intercepting and violently beating the same in the presence of said hot gaseous drying medium, by means of blades or striking members that are moved positively and at high velocity.

2. The process of granulating or finely dividing pasty semi-fluid substances, which consists in projecting the same at high velocity and intercepting and beating the same, in the presence of a hot drying medium.

3. The process of granulating or finely dividing pasty or semi-fluid substances which consists in throwing the same violently outward under the action of centrifugal force, and in intercepting and beating the same to granular form by rapidly moving blades or striking members, in the presence of a hot drying medium.

4. The process of producing from milk a dry granular divided substance which consists in delivering substantially all of the milk in a spray or shower through hot air to reduce the same to a heavy viscous consistency, and thereafter passing such heavy condensed substance again in a spray or shower through hot air to complete the reduction of the substance to a dry divided granular form.

5. The process of producing from milk a dry granular divided substance which consists in delivering substantially all of the milk in a spray or shower through hot air to reduce the same to a heavy viscous consistency and thereafter passing such heavy condensed substance in a spray or shower by centrifugal means through hot air to complete the reduction of the substance to a dry divided granular form.

6. The process of producing from milk a dry granular divided substance which consists in delivering the milk in a spray or shower through hot air to reduce the same to a heavy viscous consistency and thereafter projecting such heavy condensed substance at high velocity within a space containing hot gaseous drying material and intercepting and violently beating the same in the presence of said hot gaseous drying medium to complete the reduction of the substance to a dry divided granular form.

7. The process of producing from milk a dry granular divided substance which consists in delivering the milk in a spray or shower through hot air to reduce the same to a heavy viscous consistency, in mixing said substance with a quantity of fresh milk and again passing the mixture in a spray or shower through hot air to reduce the same to a heavy viscous consistency, and thereafter, passing all of such heavy condensed substance again in a spray or shower through hot air to complete the reduction of the substance to a dry divided granular form.

8. The process of producing from milk a dry granular divided substance which consists in delivering milk in a spray or shower through hot air to reduce the same to a heavy viscous consistency, mixing the heavy substance with a quantity of fresh milk, then repeating these steps, and finally passing all of such substance again in a spray or shower by centrifugal means through hot air to complete the reduction thereof to a dry divided granular form.

9. The process of reducing liquid or semi-liquid substances containing solid substances to finely divided form, which consists in delivering substantially all of the said liquid in a spray or shower through hot air to reduce the same to a heavy viscous consistency and thereafter passing such heavy condensed substance again in a spray or shower through hot air to complete the reduction of the substance to a dry divided condition.

In testimony whereof I affix my signature in presence of two witnesses.

JOHN C. MacLACHLAN.

Witnesses:
F. A. WHITELEY,
H. A. BOWMAN.